US005435054A

United States Patent [19]

Tonder et al.

[11] Patent Number: 5,435,054
[45] Date of Patent: Jul. 25, 1995

[54] METHOD FOR PRODUCING ELECTROCHEMICAL CELL

[75] Inventors: Pia E. Tonder, Esbjerg, Denmark; Dale R. Shackle, Morgan Hill, Calif.

[73] Assignee: Valence Technology, Inc., San Jose, Calif.

[21] Appl. No.: 152,771

[22] Filed: Nov. 15, 1993

[51] Int. Cl.[6] .............................................. H01M 6/18
[52] U.S. Cl. ................................. 29/623.5; 29/623.1; 429/192
[58] Field of Search ........................... 29/623.5, 623.1; 429/192

[56] References Cited

U.S. PATENT DOCUMENTS

| | | | |
|---|---|---|---|
| 4,625,395 | 12/1986 | Rowlette | 29/623.5 X |
| 4,792,504 | 12/1988 | Schwab et al. | |
| 4,830,939 | 5/1989 | Lee et al. | |
| 4,879,190 | 11/1989 | Lundsgaard | |
| 4,935,317 | 6/1990 | Fauteux et al. | |
| 4,990,413 | 2/1991 | Lee et al. | |
| 5,037,712 | 8/1991 | Shackle et al. | |
| 5,100,746 | 3/1992 | Muller et al. | 29/623.5 X |
| 5,229,225 | 8/1993 | Shackle | |

Primary Examiner—John S. Maples
Attorney, Agent, or Firm—Linda Deschere

[57] ABSTRACT

In a new process for making a cathode current collector assembly, a cathode composition is positioned on a substrate between the substrate and a releasable layer. Next, force is applied on the releasable layer and directed toward the substrate so as to provide a smooth cathode surface in contact with the releasable layer. The cathode composition having the releasable layer maintained thereon is cooled to reduce the tackiness of the cathode composition and then the releasable layer is removed while the cathode composition remains in its condition of reduced tackiness. In an alternative process, the cathode composition is applied and then force is applied immediatly before or simultaneously with cooling the composition to a state of reduced tackiness. An electrolyte composition is applied to the smooth surface cathode and the cathode and electrolyte compositions are cured together. In a final step, an anode layer is applied onto the electrolyte composition to form a cell assembly and further curing may occur.

33 Claims, 2 Drawing Sheets

METHOD FOR PRODUCING ELECTROCHEMICAL CELL

FIELD OF THE INVENTION

The present invention relates to the manufacture of a solid state electrochemical cell, and more particularly, a method for producing a rechargeable solid state laminar cell including a lithium anode, an electrolyte, a composite cathode and a current collector.

BACKGROUND OF THE INVENTION

Cells and batteries having an alkali metal anode (negative electrode) and finely divided metal oxide cathode (positive electrode) are known. Particularly favored are such cells comprising a lithium foil anode of a thickness of about 75 microns, and an intercalation cathode layer of a similar thickness which contains finely divided transition metal oxide, electrically conductive carbon and solid electrolyte material. An electrolyte layer having a thickness of about 25 microns is positioned between the anode and cathode and often comprises an ion conducting polymer such as polyethylene oxide complexed with an ionizable alkali metal, preferably, lithium salt. The electrolyte layer separates the anode and cathode from one another while providing transport of ions between the anode and cathode. Typically, a current collector of conductive metal is positioned on the sides of both of the electrodes away from the electrolyte layer.

The cathode (positive electrode) provides for storage of lithium ions released from the anode (negative electrode) during discharge of the battery. Such ions are releasably retained by the cathode and then are transported back to the anode during charge. The cathode is a composite of ionically and electrically conductive materials disposed between the electrolyte layer and cathode current collector plate to provide the necessary transport between such components of the cell. There are two interfaces on the cathode side of the cell, the electrolyte-cathode interface and the cathode-current collector interface. Failure of the cathode material to make good contact with the cathode current collector and with the solid electrolyte layer leads to an overall increase in cell impedance. This makes it difficult to recharge the cell.

It is desirable to further enhance contact between the positive electrode material and the respective materials of the current collector and the electrolyte layer at the interfaces so as to further reduce impedance.

It is also desirable to have a cost-effective and convenient method for manufacturing cells and batteries which reduces waste and unnecessary thickness of the electrolyte and cathode layers.

SUMMARY OF THE INVENTION

In accordance with the invention, an electrochemical cell is prepared by one of two alternative methods. In both methods, a cathode composition is applied onto a current collector in a manner which provides an internal surface of such composition which is in contact with the current collector, and an external surface of such composition which is opposite to the internal surface and not in contact with the current collector. One method relies upon cooling the cathode composition immediately after applying force or essentially simultaneously cooling while applying force to achieve a smooth cathode surface. The other method relies upon a releasable layer, application of force and cooling of the cathode composition as intermediate steps in the preparation of the cathode/current collector assembly.

In a first method, a releasable layer is applied onto the external surface of the cathode composition. With the releasable layer so placed, force or pressure is applied to the external surface of the releasable layer and transmitted through the layer to the external surface of the cathode composition sufficient to reduce discontinuities and irregularities on or in such external surface.

The discontinuities and irregularities are reduced by applying a force over the entire external The discontinuities and irregularities are reduced by applying a force over the entire external surface of the cathode composition all at once or by applying force to successive limited areas of the external surface until the entire surface has been subjected to a force sufficient to reduce such discontinuities and irregularities.

Examples of methods by which a substantially smooth surface is obtained include rolling a pressure roller over the releasable layer, pressing or applying a weight against the releasable layer and transmitted through such layer to the external surface of the cathode composition or by any other of a variety of means which reduce the incidences of peaks and valleys on and in the external surface of the cathode composition.

With the releasable layer still in place, the cathode composition is cooled for a time and at a temperature sufficient to substantially reduce the tackiness thereof or to essentially solidify the cathode composition. While maintained in a cooled state of reduced tackiness or solidity, the releasable layer is removed to provide the essentially smooth cathode surface.

In an alternative method, an essentially smooth cathode surface is achieved by applying a cathode composition onto a current collector providing an external surface of such composition which is not in contact with the current collector. Next, pressure is applied to the external surface of the cathode composition sufficient to reduce discontinuities on the external surface and the cathode composition is cooled to reduce the tackiness thereof. The cooling of the cathode composition preferably occurs immediately after the step of applying pressure to the external surface. It is also possible to essentially simultaneously cool the external surface while applying pressure thereto, whereby the tackiness of such external surface is reduced to achieve a tack-free or near tack-free condition. It is preferred that the steps of applying pressure and cooling are conducted essentially simultaneously by rolling the external surface with a chill roller or wheel at a temperature sufficient to provide a substantially solid cathode composition at a temperature of about $-20°$ C. In this embodiment, a tension is created on the substrate carrying the electrode composition forcing the cathode composition into contact with a chill roller. When the substrate is thus brought into contact with the chill roller, heat is transferred from the cathode composition to the chill roller thus preventing the cathode composition from sticking to the surface of the chill roller. After contact with the force of the chill roller, the cathode surface is rendered smooth.

In the next step of the process, an ionically conductive electrolyte composition is applied to the smooth external surface of the cathode composition and the cathode and electrolyte compositions are at least partially cured together. In a final step, an anode layer is placed on the electrolyte composition to form the completed cell assembly. If desired, the completed assembly may be rolled between pressure rollers to further adhere the cathode, electrolyte and anode layers to one another. The cathode and electrolyte compositions may also be further cured, if desired.

It is preferred that the releasable layer comprise mylar (polyethylene terephthalate, PET). Other suitable materials include teflon (tetrafluoroethylene), silicone coated polyethylene, or other films having release characteristics. It is preferred that the electrode composition comprise an active cathode material, an electrically conductive material, and an ionically conductive material. Suitable active materials are metal intercalation compounds; suitable electrically conductive material is particles of carbon; and ionically conductive material comprise an ionically conductive polymer matrix in combination with a conductive powder or conductive liquid containing an alkali metal salt. In the case of the method which utilizes a releasable layer, it has been found that a period of cooling of 8 hours in a refrigerator at a temperature of $-20°$ C., has produced suitable results. Accordingly, cooling under such conditions is suitable to achieve a tack-free or near tack-free condition. In any case, it is desirable that the cooling step reduce the temperature of the cathode composition to $-20°$ C. or less achieving an essentially solid condition. It is desirable, however, to achieve an even cooler temperature such as $-30°$ C. or less.

The method of the invention eliminates or at least reduces problems associated with the cathode composition sticking to surfaces prior to application of the electrolyte. It also eliminates problems which arise due to lack of good adherence between the cathode composition layer and the electrolyte layer at the interface between the two layers.

Accordingly, it is an object of the present invention to provide a composite cathode (positive electrode) composition having improved contact on one side with the cathode current collector and on the other side with the electrolyte layer.

These and other objects, features and advantages will become apparent from the following description of the preferred embodiments, appended claims and accompanying drawings.

DETAILED DESCRIPTION OF THE PREFERRED EMBODIMENTS

Figure 1:
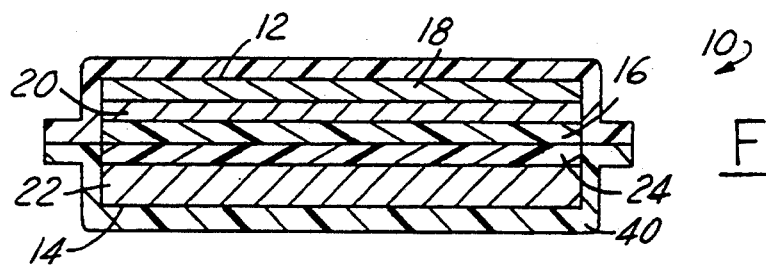
FIG. 1 is an illustration of a cross-section of a thin battery or cell embodying the invention.

As shown in the drawings, an electrochemical cell or battery 10 has a negative electrode side 12, a positive electrode side 14, and a separator 16 therebetween (FIG. 1). In accordance with common usage, a battery may consist of one cell or multiple cells. The negative electrode is the anode during discharge, and the positive electrode is the cathode during discharge. The negative electrode side includes current collector 18, typically of nickel, iron, stainless steel, and/or copper foil, and a body of negative electrode material 20.

The negative electrode material 20 is sometimes simply referred to as the negative electrode or negative electrode composition. The negative electrode side 12 may consist of only a metallic electrode 20 without a separately distinguishable current collector 18. The positive electrode side 14 includes current collector 22, typically of aluminum, nickel, iron, stainless steel, and/or copper foil, or such foils having a protective conducting coating foil, and a body of positive electrode material 24. The cathode composition 24 and current collector 22 will be more specifically described below. The positive electrode material 24 is sometimes simply referred to as the positive electrode or positive electrode composition. The separator 16 is typically a solid electrolyte, electrolyte separator. Suitable electrolyte separators (polymer electrolyte) are described in U.S. Pat. Nos. 4,830,939, 5,037,712, 4,990,413, and 5,229,225 each of which is incorporated herein by reference in its entirety. The electrolyte separator is a solid organic polymer matrix containing an ionically conducting powder or liquid with an alkali metal salt and the liquid is an aprotic polar solvent. Cell 10 also includes a protective covering (not shown) which functions to prevent water and air from contacting the reactive layers of the cell 10.

Cell 10 is preferably a laminar thin cell type including a lithium anode (negative electrode 20). Laminar thin-cell batteries containing lithium anodes are know in the art, and it will be appreciated that the cell can include various constructions such as bi-faced or bi-polar cell designs. Examples of cell constructions include a "jelly roll" or a fan folded laminate strip design as described in U.S. Pat. No. 4,879,190 incorporated herein by reference in its entirety.

Because the cell utilizes a lithium anode layer 20, it is necessary to manufacture the cell in a water (humidity) free environment. Lithium is extremely reactive with water and if reacted, a passivation layer can form on the surface of the anode layer, reducing the efficiency of the layer, and increasing cell impedance. Accordingly, it is particularly desirable to manufacture the cell in an environment having a relative humidity at room temperature of less than 2% (less than 300 ppm water). An environment containing between 1 ppm and 50 ppm water, and preferably less than 1 or 2 ppm water, produces a particularly efficient cell.

CURRENT COLLECTOR

Figure 2:
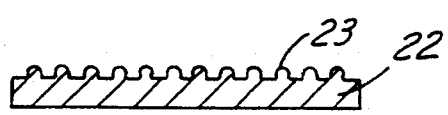
FIGS. 2-9 illustrate one process for producing a cathode/electrolyte assembly for a cell or battery of FIG. 1 including the steps of placing a releasable layer 30 on a cathode composition 24; applying force or pressure by various means to such layer and composition (FIGS. 4, 5 and 6); cooling the layer and composition (FIG. 7); removing the layer (FIG. 8); applying the electrolyte 16 (FIG. 9).

The process of the invention forms a cathode composition 24 on the current collector 22 which may be a sheet of metal foil, an electrically conductive screen, grid, expanded metal, etched foil, electrodeposited film, woven or non-woven conductive fabric. In practice, it is preferred to use as the current collector a thin metal foil having a metal, preferably the same metal, electrodeposited on the surface thereof which will contact the cathode layer. A preferred metal is known as surface-treated nickel. A microroughened or etched surface 23 on the current collector 22 enables better adherence of the cathode composition 24 to the current collector. (FIG. 2)

In practice, the thickness of current collector 22 ranges from about 5 microns to about 25 microns. Preferably, the current collector is as thin as practicable. Alternatively, the current collector can take the form of a thin polymeric film having coated thereon an electrically conductive metal. The advantage of this current collector is that it is extremely lightweight and can be utilized in extremely thin layers. An example of such a material is a polyethylene terephthalate substrate having electrodeposited thereon a first layer of copper and a second layer of nickel. The thickness of such a layer is typically about one micron but it may be as thin as practicable to minimize overall thickness of the cell.

CATHODE COMPOSITION

The cathode composition is typically a highly viscous paste or gel applied onto the microroughened surface of current collector 22. In one embodiment, cathode composition 24 is paste-like in consistency and typically includes an active cathodic material such as a transition metal chalcogenide, or an intercalation compound and an electrically conductive filler or an electrically conductive polymer such as polypyrrole, polyacetylene, polyaniline, etc.; and an ionically-conductive electrolyte (described below). The electrically conductive filler is usually carbon particles. Certain conductive polymers (which are characterized by a conjugated network of double bonds) like polypyrrol and polyacytylene may also be used for the electrically conductive filler.

ACTIVE MATERIAL

Intercalation compounds and electrically conductive materials useful in the present invention are known in the art. Representative examples of transition metal oxides and sulfides useful as active cathode materials are $V_6O_{13}$, $V_2O_5$, $MoO_2$, $TiS_2$, $MnO_2$, $V_2O_5$, $MoS_3$, $Cr_3O_6$, $Li_xV_3O_8$, $FeS$, $NiS$, $CoO$, and $CuO$. Other examples are described in the literature. The active cathode material preferably has a particle size of less than 1 micron but can range up to 20 microns. A particularly preferred intercalation compound is $V_6O_{13}$ having a particle size less than 5 microns, and particularly less than one micron. $V_6O_{13}$ comprises between 25 and 75% by weight of the entire cathode composition, and preferably between 45 and 65%.

It is particularly desirable to maintain good contact between the cathode material and the carbon particles while maximizing the amount of cathode material available for ionic interaction. If the ratio of a cathode material such as $V_6O_{13}$ to carbon is greater than 10 to 1 by weight, the cathode composition provides poor electronic conductivity due to the lack of carbon. Conversely, if the ratio is less than 5 to 1, an excess of carbon is present which does not significantly improve electrical conductivity but does reduce capacity due to the reduced amount of intercalation compound present.

The optimum ratio of carbon to a transition metal chalcogenide will vary with particle size and processing or grinding techniques used. Preferably the carbon black and metal oxide are ball milled together. The preferred ratio is between 6 to 1 and 7 to 1. Moreover, unless the ratio of $V_6O_{13}$ to carbon is maintained between 5:1 and 10:1, it is very difficult to coat the cathode composition onto the current collector. If too much carbon is present, the cathode composition has a non-compacted sand-like consistency.

CONDUCTIVE ELECTROLYTE

The third component of the cathode composition is an ionically conductive electrolyte. This material is typically prepared from a composition which comprises a liquid, monomeric or prepolymeric polymerizable compound, and a solution of an ionizable alkali metal salt, or solid alkali metal salt, or solid ionically conductive powders which are maintained in the ionically conductive polymer matrix. Suitable compositions are as described in U.S. Pat. Nos. 4,830,939, 4,990,413, and 4,935,317, which are incorporated herein by reference in their entirety.

The ionically conductive polymer is often simply referred to as an electrolyte or electrolyte/binder. It should be noted that the electrolyte/binder described herein is usable for both the cathode composition and for the electrolyte separator 16 disposed between the negative and positive electrode compositions 20 and 24. Accordingly, the properties of the electrolyte/binder (e/b) polymer will be described with reference to both uses. It should also be noted that if the electrolyte layer is applied uncured (i.e., wet) onto the cathode composition, then it may be preferable to have different electrolyte/binders in the electrolyte layer and in the cathode. It is thought that such difference will prevent diffusion of the uncured redox active polymer from the wet cathode mixture into the wet electrolyte layer.

The (electrolyte/binder) polymers have repeating units containing at least one heteroatom such as an oxygen or nitrogen atom. They can be represented as polymers having the repeating unit

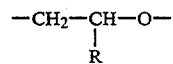

wherein R is hydrogen or a group Ra, —CH₂ORa, —CH₂OReRa, —CH₂N(CH₃)₂, in which Ra is an alkyl group containing 1 to 16 carbon atoms and preferably 1 to 4 carbon atoms or a cycloalkyl group containing 5 to 8 carbon atoms, and Re is an ether group of formula —CH₂CH₂—O$_p$— wherein p is a number from 1 to 100, preferably 1 or 2: or having the repeating unit

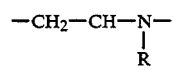

wherein R is Ra or ReRa, as defined above; or having a repeating unit

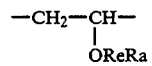

wherein Re and Ra are as defined above. Copolymers of the above polymers may also be useful.

The electrolyte/binder polymer is typically prepared from a composition which comprises a liquid, monomeric or prepolymeric polymerizable compound, and a solution of an ionizable alkali metal salt. Electrolyte/binder compositions and methods for forming such compositions from precursors are described in U.S. Pat. Nos. 4,830,939 and 4,935,317 which are incorporated herein by reference in their entirety.

Ionizable alkali metal and alkaline earth salts useful in the electrolyte include those salts conventionally used in electrochemical cells. Representative examples are $Li+$, $Na+$, $K+$, $Mg^{2+}$, $Ca^{2+}$, and ammonium salts of less mobile anions of weak bases having a large anionic radius. Examples of such anions may be selected from the group consisting of $I-$, $Br-$, $SCN-$, $ClO_4-$, $BF_4-$, $PF_6-$, $AsF_6-$, $CF_3COO-$, $CF_3SO_3-$, $CF_3CO_3-$, $B_{12}H_{12}^{2-}$, $B_{10}Cl_{10}^{2-}$, and $Bo_4-$, where o is $C_6H_5$, an alkyl chain or an aryl chain, wherein such salt cation and anion are maintained in stoichiometric amounts. More specific examples are: $LiAsF_6$, $LiClO_4$, $NaClO_4$, $LiF_3SO_3$, $LiBF_4$, and the preferred $LiPF_6$.

The solvent for the salt can be any low volatile aprotic polar solvent. Preferably, these materials are characterized by a boiling point greater than about 80° C. Low volatility simplifies manufacture and improves shelf life. If the polymeric network is formed by radiation polymerization, the solvent should be inert to the radiation and likewise if the network is formed by thermal polymerization, the solvent should be inert in this regard. In particular, the solvent should not scavenge free radicals. Representative examples are propylene carbonate, -butyrolactone, 1.3-dioxolane, phentydrone (THF, tetrahydro-q-fluorenone) and 2-methyltetrahydrofuran. Less polar solvents having heteroatoms capable of bonding alkali metal cations are also useful. Polyethylene glycol dimethyl ether (PEGDME) is one such example. Glymes such as tetraglyme, hexaglyme and heptaglyme are also desirable solvents.

Compounds which yield a conductive polymer contain a heteroatom capable of forming donor-acceptor bonds with the alkali metal cation. Useful polymerizable compounds are described next.

Polyethylenically unsaturated monomeric or prepolymonomeric materials useful in the present invention are preferably compounds having at least one, and more preferably a plurality, of heteroatoms (particularly oxygen and/or nitrogen atoms) capable of forming donor-acceptor bonds with an alkali metal cation and are terminated by polymerizable moieties. These compounds yield a conductive supportive matrix. More specifically, they are preferably low molecular weight oligomers of the formulae (I)-(III) below:

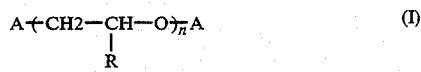

(I)

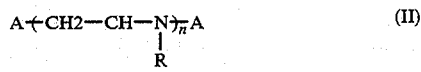

(II)

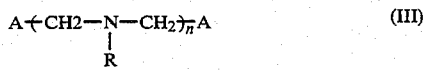

(III)

where n is about 3 to 50 and R is hydrogen or a C1-C3 alkyl group, which are terminated by ethylenically unsaturated moieties or glycidyl moieties represented by A.

A particularly useful group of polymerizable compounds is obtained by reacting a polyethylene glycol with acrylic or methacrylic acid. Also useful in the present invention are curable materials such as acrylated epoxies, eg Bisphenol A epoxy diacrylate, polyester acrylates, copolymers of glycidyl ethers and acrylates or a vinyl compound such as N-vinylpyrrolidone. The latter provide a non-conductive matrix.

The curable electrolyte mixture of this invention contains at least 45% by weight of the solvent and about 10 to 55% by weight and preferably 10 to 25% by weight of the polymerizable compound, as well as 5 to 20% by weight of the alkali metal salt. The exact amount of the polymerizable compound and the solvent should be adjusted to provide the optimum combination of strength and conductivity for the particular application. If the mixture contains greater than about 55% polymerizable material, the electrolyte exhibits poor conductivity. In those cases in which the electrolyte composition itself or an electrode composition containing the electrolyte is coated on a supporting member, such as a current collector or an electrode half element, the electrolyte often is not required to have the structural integrity of a free standing film. In those applications it is permissible and advantageous to use a higher quantity of the inert liquid because greater conductivity can be achieved. For example, it is advantageous to use about 70 to 80% of the radiation inert liquid.

Preferably, the aforementioned polymerizable polyethylenically unsaturated compounds have a molecular weight of about 200 to 2,000 and more preferably 200 to 800. Still more preferably they are liquids at temperatures less than 30° C. Examples of curable materials include polyethylene glycol-300 diacrylate (average PEO molecular weight of about 300), polyethylene glycol 480 diacrylate (average PEO molecular weight of about 480) and the corresponding methacrylates.

It may be desirable to include a curable comonomer in the composition to reduce the glass transition temperature and improve the conductivity of the polymer. Any suitable monoacrylate such as tetrahydrofurfuryl acrylate, tetrahydrofurfuryl methacrylate, methoxypolyethylene glycol monomethacrylate, 2-ethoxyethyl acrylate, 2-methoxyethyl acrylate or cyclohexyl methacrylate may be used for this purpose. Triacrylates such as trimethylolpropopane triacrylate (TMPTA), trimethylolpropane ethoxylated triacrylates (TMPEOTA) or trimethylolpropanepropoxy triacrylate may be used to introduce crosslinking of the polymer. Monoacrylates may be used in an amount of about 5 to 50% by weight based on the total amount of radiation polymerizable material. The triacrylates are used in amounts of about 2 to 30% by weight on the same basis.

One radiation curable polymer composition contains polyethylene oxide (PEO), polyethylene glycol diacrylate, (PEG-DA), trimethylolpropane ethoxylated triacrylate (TMPEOTA), $LiCF_3SO_3$ and a suitable ionic conductive solvent such as tetraglyme or propylene carbonate (PC).

An electrolyte may be prepared by mixing together components in the weight fractions shown in Table I.

TABLE I

| Component | Percent Weight |
| --- | --- |
| PC | 68 |
| $LiAsF_6$ | 18 |
| PEO | 2.5 |
| PEGDA | 9.2 |
| TMPEOTA | 2.3 |

The overall water concentration of the electrolyte is less than 50 ppm. The electrolyte is coated onto the cathode layer by using a doctor blade at room temperature.

An example of a typical cathode composition is as set forth below in Table II:

TABLE II

| Typical Cathode Composition | Percent Weight |
| --- | --- |
| Active Material | 45.0 |
| Carbon | 10.0 |
| Propylene Carbonate (PC) | 33.0 |
| PolyEthylene Oxide (PEO) | 1.0 |
| PolyEthyleneGlycolDiAcrylate (PEGDA) | 9.0 |
| TriMethylPolyEthylene Oxide TriAcrylate (TMPEOTA) | 2.0 |

The polymerizable electrolyte and cathode compositions described herein may be polymerized (cured) by radiation, heat or other chemical means. In a particularly preferred embodiment the compositions are cured by exposure to an electron beam. The electron beam is capable of generating free radicals and initiating polymerization without any photoinitiator. To use other forms of radiation, a photoinitiator may be required. Similarly to cure the compositions by heating, a thermal initiator is required. Examples of thermally cured polymers are set forth in U.S. Pat. No. 4,792,504 to Schwab et al., which is hereby incorporated by reference.

COATING, CURING AND CELL ASSEMBLY

The cathode/current collector assembly which includes the cathode composition having an essentially continuous external surface and the electrolyte composition carried thereon are prepared and then at least partially cured. Following are two alternative methods. One relies upon a releasable layer, application of force and cooling of the cathode composition as intermediate steps in the preparation of the cathode/current collector assembly. The other method relies upon cooling the cathode composition immediately after applying force or essentially simultaneously cooling while applying force to achieve a smooth cathode surface.

Figure 3:
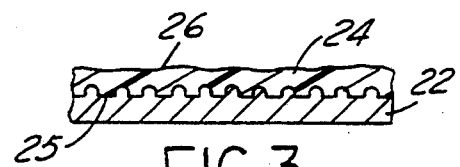

Referring to FIG. 3, a cathode/composition 24 is coated as a thin film onto current collector 22 having a microroughened surface 23 such as surface treated nickel, e.g., nickel foil having nickel dendrites electrodeposited on the surface. Coating may be accomplished using conventional coating techniques such as a doctor blade or an extrusion method. In practice, the optimum thickness ranges between about 25 and about 250 microns. The applied cathode layer has an internal surface 25 facing the roughened surface 23 of the current collector and an external surface 26.

In an alternative embodiment, the cathode composition 24 may be first dispersed in a volatile solvent prior to coating onto substrate or current collector 22. The volatile solvent must be chemically inert with respect to the components of the cathode composition and preferably have a boiling point between 40° C. and 90° C., and more preferably less than 80° C. Examples of suitable solvents include tetrahydrofuran, dimethyl ether, methyl formate, acetone, low boiling point alcohols and low boiling point hydrocarbons (n-hexane, n-heptane, etc.). Other solvents, not specifically listed above, may be selected as long as they are chemically inert low boiling point liquids. Use of a volatile solvent provides benefits in that the viscosity of the coating composition is reduced, making it much easier to coat. In addition, because the solvent is ultimately evaporated, a higher amount of active cathode composition may be present in the dispersion. This can increase the amount of active composition present per unit area as compared to cathode compositions which are not initially solvent cast/coated. Accordingly, the electronic efficiency of the cell per unit area can be improved. This applied cathode layer 24 also has an internal surface 25 facing the roughened surface 23 of the current collector and an external surface 26 opposite the internal surface.

Figure 4:
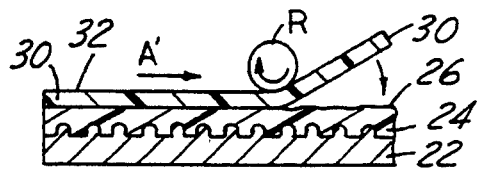
Figure 5:
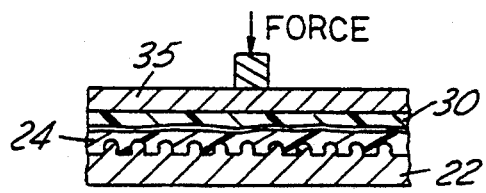

Next, a releasable layer 30 is applied to the external surface 26 of the cathode composition 24. (FIG. 4) Then, with such releasable layer 30 in place, force or pressure is applied to the exposed surface 32 of such layer 30. (FIGS. 4 and 5) The force or pressure is transmitted through the releasable layer and applied to the underlying cathode composition. This at least reduces surface discontinuities and irregularities in the external surface 26 of the cathode and preferably renders such surface substantially smooth and continuous. If the cathode composition 24 is initially dispersed and cast in a volatile solvent, the solvent is evaporated prior to the reduction of surface discontinuation and irregularity. Evaporation may be accomplished either by maintaining the coated current collector 22 at ambient conditions for an extended period of time, or more preferably, by heating the cathode composition coated current collector 22 to above the boiling point of the volatile solvent.

It is preferred that the step of reducing surface discontinuities and irregularities at the external surface of the cathode composition be accomplished by means of force of pressure roller R which traverses the exterior surface of the releasable layer or cathode composition in the direction of arrow A to cause a tight adherence between the cathode composition 24 and the current collector 22. The smooth continuous, high viscosity surface 26 produced after such rolling enables a very thin electrolyte layer to be coated thereon. The impedance at the interface between the electrolyte and the cathode composition in the completed cell is thus, substantially reduced. The material which forms the releasable layer 30 can be selected from a number of materials including polymeric films, metal foils, coated papers and the like. Metal foils such as aluminum or stainless steel having mirrored surfaces are useful. It is preferred that the releasable layer be a polymeric, releasable, non-adhesive, non-stick composition such as mylar (polyethylene terephthalate), or a polymer such as nylon with a polytetrafluoroethylene coating (teflon).

Figure 10:
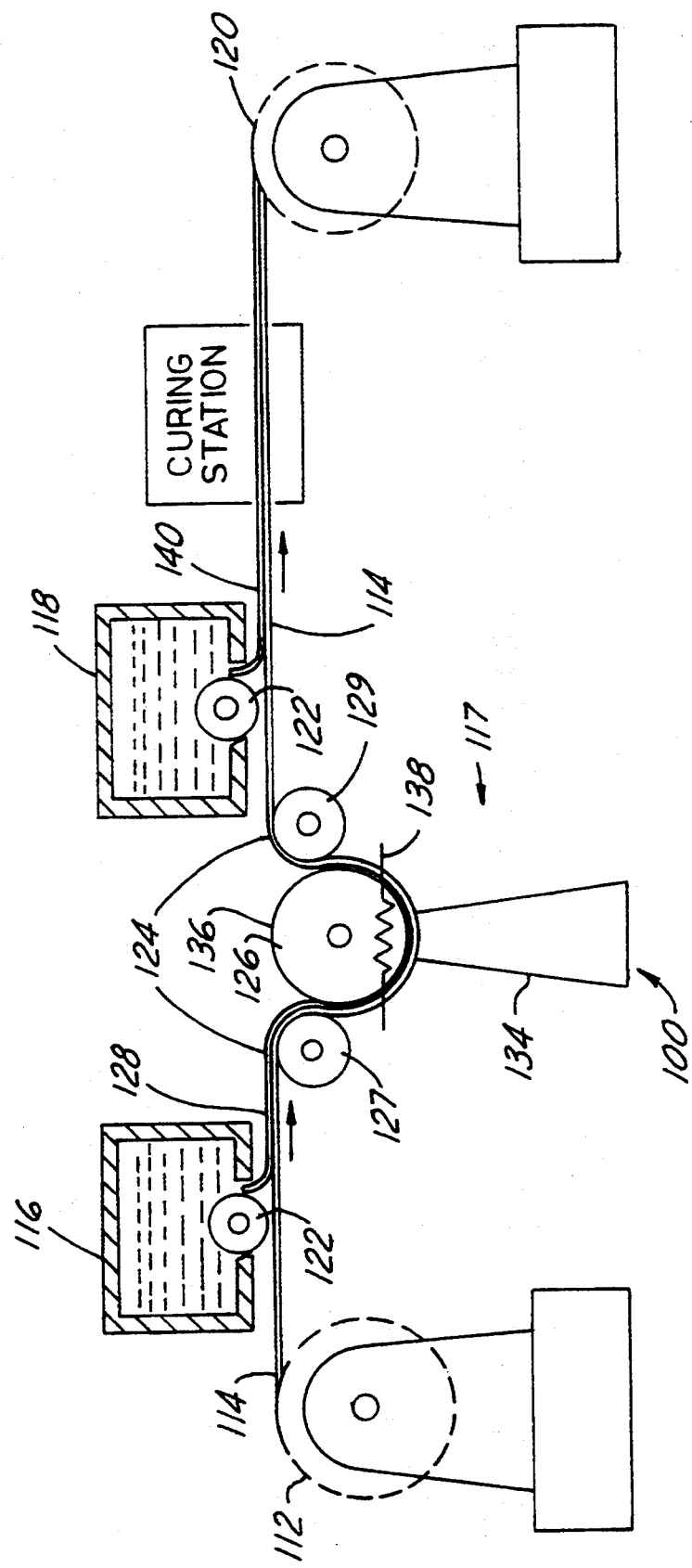
FIG. 10 shows another process for producing a cathode/electrolyte assembly with the completed assembly represented in FIG. 9.

The applied force or pressure functions to substantially eliminate surface discontinuities and irregularities and improve the adherence, and hence the electrical contact between the cathode composition and the electrolyte and thereby reduces the impedance at the cathode/electrolyte interface. Further, the continuous, high viscosity and substantially smooth external surface produced on the cathode composition enables a very thin electrolyte layer to be coated thereon after chilling of the cathode composition and removal of the releasable layer. In addition, the process produces greater contact between the microroughened surface of the current collector and the cathode material. This is particularly evident when the processes of FIGS. 6 and 10 are used as described below.

As an alternative to a pressure roller which traverses the surface of the releasable layer, there may also be used a press 35 (FIG. 5), weight or a blunt instrument having a leading edge which moves along the surface of the releasable layer applying pressure thereon. A continuous belt and drum combination may also be used while the releasable layer is held firmly in place. The belt is continuously rolled on the surface of the releasable layer and taken up by a drum in combination with a suitable drive.

Figure 6:
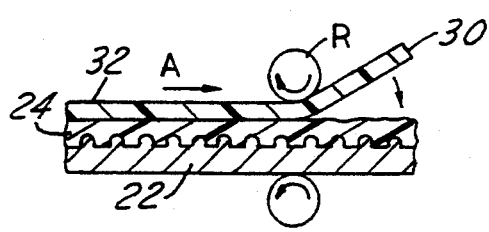

Those skilled in the art will understand that more than one roller may be used, one disposed on either side of the cathode current collector carrying the releasable layer where one pressure roller contacts the releasable layer and the other pressure roller contacts the current collector as shown in FIG. 6.

Figure 7:
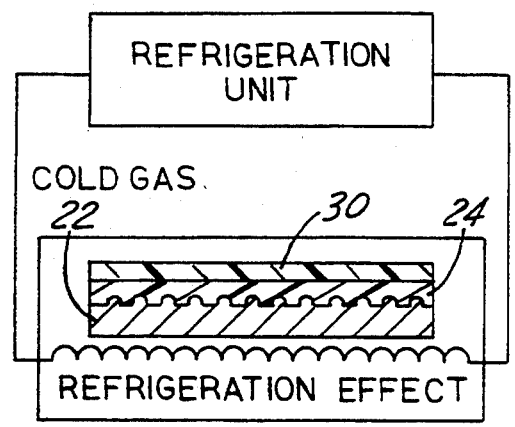

After the step of providing the continuous essentially smooth cathode surface 26, the releasable layer 30 remains on such surface 26 and the entire assembly is cooled for a time and at a temperature sufficient to reduce the tackiness of the cathode composition. (FIG. 7) It has been found that cooling to a temperature of below about $-20°$ C. is suitable to achieve a tack-free or near tack-free condition. It is desirable, however, to achieve an even cooler temperature such as $-30°$ C.

Figure 8:
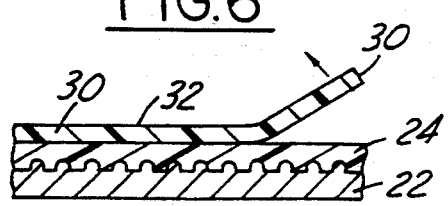
Figure 9:
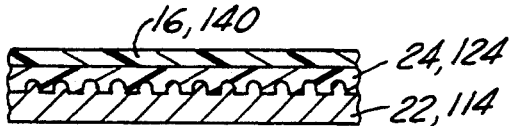

Next, the releasable layer 30 is removed from the cooled assembly while maintaining the cathode composition in its condition of reduced tackiness by virtue of its cooled condition. (FIG. 8) This provides the smooth external surface of the cathode composition ready for application of an electrolyte. Then, an electrolyte composition 16 is applied onto the cathode composition. (FIG. 9)

The electrolyte can be extruded and coated in a very thin layer typically ranging from about 5 to about 25 microns. When the electrolyte 16 is coated onto the external surface 26 of the cathode composition 24, it is coated in an uncured viscous and often substantially liquid state. It completely covers the cathode composition layer to prevent protrusion of cathode composition components through the electrolyte layer.

Once the electrolyte layer 16 has been coated onto the cathode composition, the assembly is partially or totally cured by exposure to actinic radiation, heating, or by utilizing a chemical polymerization method. It has been found that exposure to an electron beam operating at a power of 3 to 9M rad is useful. Alternatively, an ultraviolet source may be selected. If an ultraviolet source is selected, the monomer preferably includes an ultraviolet initiator of the type commonly known in the art such as thioxanthone initiators. Similarly, if thermal curing is selected, the cathode composition and electrolyte should include a thermal initiator. Curing the cathode composition and the electrolyte polymerizes and crosslinks and thereby solidifies the monomeric material by conversion to a polymeric form.

A partial curing step (as opposed to full curing) may be particularly desirable as this enables the electrolyte layer 16 to remain somewhat tacky. This enables better adherence between the electrolyte and the anode layer, when laminated.

In an alternative method, an essentially smooth cathode surface is achieved by applying a cathode composition onto a current collector providing an external surface of such composition which is not in contact with the current collector. Next, pressure is applied to the external surface of the cathode composition sufficient to reduce discontinuities on the external surface and the cathode composition is cooled to reduce the tackiness thereof. The cooling of the cathode composition preferably occurs immediately after the step of applying pressure to the external surface. It is also possible to essentially simultaneously cool the external surface while applying pressure thereto, whereby the tackiness of such external surface is reduced to achieve a tack-free or near tack-free condition. It is preferred that the steps of applying pressure and cooling are conducted essentially simultaneously by rolling the external surface with a chill roller or wheel at a temperature sufficient to provide a substantially solid cathode composition at a temperature of about $-20°$ C. In this embodiment, a tension is created on the substrate carrying the electrode composition forcing the cathode composition into contact with a chill roller. When the substrate is thus brought into contact with the chill roller, heat is transferred from the cathode composition to the chill roller thus preventing the cathode composition from sticking to the surface of the chill roller.

Referring to FIG. 10 an apparatus for forming an essentially smooth cathode layer on a substrate 114 is schematically illustrated and designated as 100. Apparatus 100 includes spool 112 which feeds substrate 114 to cathode application station 116, to press and chill station 117, to electrolyte applicator station 118 and then onto receiver spool 120. Receiver spool 120 is power driven and pulls substrate 114 past station 116. Cathode coating station 116 includes an applicator 122 which applies a layer of cathode composition onto substrate sheet 114. Still referring to the figure, apparatus 100 also includes a chilling roller 126 which functions to cool the external surface 128 of the cathode composition 124 so as to rapidly solidify it or render it to a near tack-free condition. Preferably the chill roller 126 is mounted on a support 134 which permits adjustment of the roller 126 with respect to the substrate 114, spools 112, 120 and rollers 127, 129 to apply force to the external surface 128 of the cathode composition in contact with the surface 136 of the roller 126. Substrate 114 carrying cathode composition 128 is preferably pressed between roller 126 and 127 and between roller 126 and 128. The chill roller 126, the spools 112,120, and rollers 127, 129 achieve appropriate degree of tension and compression and cooling for application of force to the external surface 128 of the cathode composition 124 and to control the temperature thereof. In a preferred process, the chill roller 126 rotates at a speed of approximately 1 to 100 rotations per minute and the spools 112,120 advance the substrate 114 at a rate of approximately 1 to 100 meters per minute. The chill roller 126 is preferably cooled by coil 138 to a temperature below the coolest temperature to which it is desired to chill the cathode material, namely, $-30°$ C. or less and preferably $-20°$ C. or less. The chill roller 126 is of plastic or polished or coated metal. For example, it may be stainless steel or copper. It may be clad on its exterior 136 with a Teflon (tetrafluorsethylene) material to further reduce the possibility of cathode material 124 sticking to it.

After pressing the cathode composition 124 against the chill roller 126, the electrolyte 140 is applied at station 118 using applicator 122. (FIGS. 9 and 10) Next, the electrolyte 140 and cathode 124 layers are at least partially cured together at a curing station. If desired, cathode composition 124 may be cured in an optional curing step prior to application of the electrolyte. A partial curing step at curing station of FIG. 10 enables better adherence between the electrolyte and the anode layer when laminated.

Although the process is shown in the drawing as being in an essentially horizontal orientation, it is to be understood that the process may be conducted in essentially any orientation, for example, rotated 90° or 180° to the orientation shown in the diagram. This is not critical so long as the necessary force or pressure against the external surface of the cathode composition 124 is achieved. The direction of rotation of chill roller 126 relative to the direction of movement of the substrate 114 is not critical. It is preferred that roller 126 move in the same direction as the direction of the substrate 114 and respective spools 112,120.

After partial or total curing of cathode composition 24, 124 and electrolyte 16, 140 alkali metal anode layer 12 is applied to electrolyte layer 16, 140. Although not pictured, a thin polymeric material such as a porous polypropylene sheet may be applied at the edges separating the anode and the electrolyte to ensure that the anode does not contact the cathode layer, particularly at the outer edges of the respective layers. Use of the polymeric material is optional.

Alkali metal anode side 12 may take the form of a single lithium or lithium alloy foil 20; or a lithium-coated foil such as nickel or copper foil 18 having a layer of lithium 20 deposited on its surface. Examples of lithium alloys include Li-Al, Li-Si, Li-Sn, Li-Cd, Li-Zn, Li-Pb, and Li-N. However, in the most typical embodiment, a lithium foil 20 or lithium-coated metal foil 18, 20 is used. In practice, commercially available foils are used which range from about 50 to 125 microns. Lithium is a preferred anode material because it is very electropositive and light in weight. However, other electropositive alkali metal materials, such as sodium, may be practiced within the scope of the invention.

Figure 11:
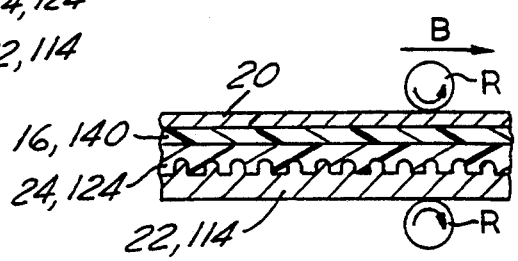
FIG. 11 shows completing the cell 10 using the cathode/electrolyte assemblies of FIGS. 2-9 and 10.

After the anode layer 20 is laminated onto electrolyte 16, 140, the entire assembly is optionally passed through pressure rollers R in the direction of arrow B as shown in FIG. 11. The pressure rolling step aids in the adhesion of the layers to each other, thereby reducing interfacial impedance between component layers.

If the cathode composition 24,124 and electrolyte 16,140 have not been completely cured, the entire assembly is again cured by exposure to actinic radiation, preferably electron beam radiation, heating and the like. This step functions to solidify the cathode composition and electrolyte layers, thereby producing a solid state cell.

Once the current collector, cathode composition, electrolyte composition and anode composition have been assembled, electrodes are attached to the anode and current collector layers by means known in the art. The assembly is then inserted into an air and water impermeable protective material and the edges of the protective material are sealed, preferably by heat sealing around the edges of the cell components. Sealing preferably occurs under vacuum conditions to enable the protective material to form a sealed container 40 around the component layers and electrodes such that the only external access to the component layers is via the electrodes. (FIG. 1)

Examples of heat sealable gas and water permeable protective materials include a multi-layered material having an interior heat sealable layer comprising ethylene acrylic acid, an intermediate barrier layer comprising aluminum foil, and an exterior layer of polyethylene terephthalate. Other heat sealable protective materials known in the art can be used in accordance with the present invention. The protective materials should be as thin as possible to minimize the overall thickness of the cell. Commercially available heat sealable materials of the types described above can have an overall thickness of less than 200 microns.

While this invention has been described in terms of certain embodiments thereof, it is not intended that it be limited to the above description, but rather only to the extent set forth in the following claims.

The embodiments of the invention in which an exclusive property of privilege is claimed are defined in the appended claims.

We claim:

1. A process for making an electrochemical cell comprising the steps of:
   a. applying a cathode composition onto a current collector providing an external surface of such composition which is not in contact with the current collector;
   b. applying a releasable layer onto the external surface of the cathode composition;
   c. applying pressure to the external surface of the cathode composition sufficient to reduce discontinuities and irregularities on the external surface;
   d. cooling the cathode composition of step (c) for a time and at a temperature each sufficient to reduce the temperature of the cathode composition to −20° C. or less to reduce the tackiness thereof;
   e. removing the releasable layer while maintaining such cathode composition in a condition of reduced tackiness;
   f. applying an ionically conductive electrolyte composition onto the cathode composition of step (e);
   g. at least partially curing the cathode and the electrolyte compositions; and
   h. applying an anode layer onto the electrolyte composition of step (g) to form a cell assembly.

2. The process according to claim 1 wherein the step of applying pressure comprises rolling with a pressure roller the external surface of the releasable layer which is not in contact with the cathode composition.

3. The process according to claim 1 wherein the releasable layer comprises Mylar (polyethylene terephthalate, PET), Teflon (polytetrafluoroethylene), or silicone coated polyethylene.

4. The process according to claim 1 wherein the cathode composition comprises an active cathode material, an electrically conductive material, and an ionically conductive material.

5. The process according to claim 1 comprising the additional step of applying pressure to the cell assembly sufficient to further adhere the anode layer to the electrolyte composition and the electrolyte composition to the cathode composition.

6. A process for making an electrochemical cell comprising the steps of:
   a. applying a cathode composition onto a current collector providing an external surface of such composition which is not in contact with the current collector;
   b. applying a releasable layer onto the external surface of the cathode composition;
   c. applying pressure to the external surface of the cathode composition sufficient to reduce discontinuities and irregularities on the external surface;
   d. cooling the cathode composition of step (c) for a time and at a temperature sufficient to substantially solidify the cathode composition to reduce the tackiness thereof;
   e. removing the releasable layer while maintaining such cathode composition in a condition of reduced tackiness;
   f. applying an ionically conductive electrolyte composition onto the cathode composition of step (e);

g. at least partially curing the cathode and the electrolyte compositions; and h. applying an anode layer onto the electrolyte composition of step (g) to form a cell assembly.

7. The process according to claim 6 wherein the step of applying pressure comprises rolling with a pressure roller the external surface of the releasable layer which is not in contact with the cathode composition.

8. The process according to claim 6 wherein the releasable layer comprises Mylar (polyethylene terephthalate, PET), Teflon (polytetrafluoroethylene), or silicone coated polyethylene.

9. The process according to claim 6 wherein the cathode composition comprises an active cathode material, an electrically conductive material, and an ionically conductive material.

10. The process according to claim 9 wherein the ionically conductive material comprises an ionically conductive polymeric matrix and an ionically conductive powder or such matrix and an alkali metal salt complexed with a conductive liquid.

11. The process according to claim 6 comprising the additional step of applying pressure to the cell assembly sufficient to further adhere the anode layer to the electrolyte composition and the electrolyte composition to the cathode composition.

12. A process for making a cathode/current collector comprising the steps of:
 a. positioning a cathode composition on a substrate between the substrate and a releasable layer;
 b. directing pressure on the releasable layer and toward the substrate;
 c. cooling the cathode composition for a time and at a temperature each sufficient to reduce the temperature of the cathode composition to $-20°$ C. or less to reduce the tackiness thereof; and
 d. removing the releasable layer while maintaining the cathode composition in a condition of reduced tackiness.

13. The process according to claim 12 and including at least partially curing the cathode composition.

14. The process according to claim 12 and including:
 a. applying an electrolyte composition onto the cathode composition of step 12(d);
 b. at least partially curing the cathode and the electrolyte compositions; and
 c. applying an anode layer onto the electrolyte composition to form a cell assembly.

15. The process according to claim 12 wherein the releasable layer comprises Mylar (polyethylene terephthalate, PET), Teflon (polytetrafluoroethylene), or silicone coated polyethylene.

16. A process for making a cathode/current collector comprising the steps of:
 a. positioning a cathode composition on a substrate between the substrate and a releasable layer;
 b. directing pressure on the releasable layer and toward the substrate;
 c. cooling the cathode composition to substantially solidify the cathode composition to reduce the tackiness thereof; and
 removing the releasable layer while maintaining the cathode composition in a condition of reduced tackiness.

17. The process according to claim 16 and including at least partially curing the cathode composition.

18. The process according to claim 16 and including:
 (a) applying an electrolyte composition onto the cathode composition of step 16(d);
 (b) at least partially curing the cathode and the electrode compositions; and
 (c) applying an anode layer onto the electrolyte composition to form a cell assembly.

19. The process according to claim 16 wherein the releasable layer comprises Mylar (polyethylene terephthalate, PET), Teflon (polytetrafluoroethylene), or silicone coated polyethylene.

20. A process for making an electrochemical cell comprising the steps of:
 a. applying a cathode composition onto a current collector providing an external surface of such composition which is not in contact with the current collector;
 applying pressure to the external surface of the cathode composition sufficient to reduce discontinuities on the external surface and essentially simultaneously cooling the cathode composition for a time and at a temperature sufficient to reduce the tackiness thereof by rolling the external surface with a chill roller;
 applying an ionically conductive electrolyte composition onto the pressed and chilled cathode composition;
 d. at least partially curing one or both of the cathode and the electrolyte compositions; and
 e. applying an anode layer onto the electrolyte composition to form a cell assembly.

21. The process according to claim 20 comprising the additional step of applying pressure to the cell assembly sufficient to further adhere the anode layer to the electrolyte and the electrolyte to the cathode.

22. A process for making an electrochemical cell comprising the steps of:
 a. applying a cathode composition onto a current collector providing an external surface of such composition which is not in contact with the current collector;
 b. applying pressure to the external surface of the cathode composition sufficient to reduce discontinuities on the external surface;
 c. cooling the cathode composition for a time and at a temperature sufficient to reduce the temperature of the cathode composition to a substantially solidified condition or to about $-20°$ C. or less thereby reducing the tackiness thereof;
 d. applying an ionically conductive electrolyte composition onto the pressed and chilled cathode composition;
 e. at least partially curing one or both of the cathode and the electrolyte compositions; and
 f. applying an anode layer onto the electrolyte composition to form a cell assembly.

23. The process according to claim 22 wherein the step of applying pressure comprises rolling with a pressure roller the external surface of the cathode composition.

24. The process according to claim 22 comprising the additional step of applying pressure to the cell assembly sufficient to further adhere the anode layer to the electrolyte and the electrolyte to the cathode.

25. The process according to claim 22 wherein the step of applying pressure and the step of cooling are conducted essentially simultaneously.

26. A process for making a cathode/current collector comprising the steps of:

a. applying a cathode composition onto a substrate providing an external surface of such composition which is not in contact with the substrate;

b. directing pressure on the external surface and toward the substrate; and c. immediately after step (b) and/or during step (b), cooling the cathode composition to reduce the temperature of the cathode composition to a substantially solidified condition or to about −20° C. or less thereby reducing the tackiness thereof.

27. The process according to claim 26 and including at least partially curing the cathode composition.

28. The process according to claim 26 and further including after step 26(c);

a. applying an electrolyte composition onto the cathode composition;

b. at least partially curing the cathode and the electrolyte compositions; and c. applying an anode layer onto the electrolyte composition to form a cell assembly.

29. A process for making a cathode/current collector comprising the steps of:

a. applying a cathode composition onto a substrate providing an external surface of such composition which is not in contact with the substrate; and b. directing pressure on the external surface and toward the substrate, and cooling the cathode composition to reduce the tackiness thereof by rolling the external surface with a chill roller.

30. The process according to claim 29 and including at least partially curing the cathode composition.

31. The process according to claim 29 and further including after step 29(b):

a. applying an electrolyte composition onto the cathode composition;

b. at least partially curing the cathode and the electrolyte compositions; and c. applying an anode layer onto the electrolyte composition to form a cell assembly.

32. A process for making a cathode/current collector comprising the steps of:

a. applying a cathode composition onto a substrate providing an external surface of such composition which is not in contact with the substrate;

b. directing pressure on the external surface and toward the substrate;

c. immediately after step (b) and/or during step (b), cooling the cathode composition to reduce the tackiness thereof; and d. after step (c), at least partially curing the cathode composition.

33. A process for making a cathode/current collector comprising the steps of:

a. applying a cathode composition onto a substrate providing an external surface of such composition which is not in contact with the substrate;

b. directing pressure on the external surface and toward the substrate;

c. immediately after step (b) and/or during step (b), cooling the cathode composition to reduce the tackiness thereof;

d. after step (c), the additional steps of:
   i. applying an electrolyte composition onto the cathode composition;
   ii. at least partially curing the cathode and the electrolyte compositions; and
   iii. applying an anode layer onto the electrolyte composition to form a cell assembly.

* * * * *